United States Patent
Nitschke (10) Patent No.: US 6,976,223 B1
(45) Date of Patent: Dec. 13, 2005

(54) METHOD AND SYSTEM TO ESTABLISH DEDICATED INTERFACES FOR THE MANIPULATION OF SEGMENTED IMAGES

(75) Inventor: Gene M Nitschke, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/411,642

(22) Filed: Oct. 4, 1999

(51) Int. Cl.$^7$ ............................. G06F 3/00; G06K 9/46
(52) U.S. Cl. ..................... 715/764; 715/860; 715/522; 715/526; 715/810; 715/779; 382/173; 382/180; 382/176
(58) Field of Search .................. 345/764, 856, 345/625, 627, 642, 810, 779, 835, 840, 846, 345/596; 382/173, 176, 180, 190, 224, 165, 382/170, 171; 715/764, 856, 859, 860, 810, 715/779, 835, 840, 846, 530, 520, 522, 526, 715/527

(56) References Cited

U.S. PATENT DOCUMENTS

| | | | |
|---|---|---|---|
| 5,339,172 A | | 8/1994 | Robinson |
| 5,390,029 A | * | 2/1995 | Williams et al. ............. 358/448 |
| 5,513,282 A | * | 4/1996 | Williams ..................... 382/303 |
| 5,596,690 A | | 1/1997 | Stone et al. |
| 5,710,877 A | * | 1/1998 | Marimont et al. ........... 345/427 |
| 5,745,596 A | * | 4/1998 | Jefferson ..................... 382/176 |
| 5,751,856 A | * | 5/1998 | Hirabayashi ................. 382/232 |
| 5,765,029 A | * | 6/1998 | Schweid et al. .............. 395/61 |
| 5,767,978 A | * | 6/1998 | Revankar et al. ........... 358/296 |
| 5,787,194 A | * | 7/1998 | Yair ........................... 382/173 |
| 5,802,203 A | * | 9/1998 | Black et al. ................. 382/173 |
| 5,809,179 A | * | 9/1998 | Marimont et al. ....... 382/173 X |
| 5,850,474 A | * | 12/1998 | Fan et al. .................... 382/173 |
| 5,850,475 A | * | 12/1998 | Kasao ......................... 382/173 |
| 5,874,966 A | * | 2/1999 | Polimeni et al. ............ 345/431 |
| 5,875,265 A | * | 2/1999 | Kasao ......................... 382/229 |
| 5,889,523 A | * | 3/1999 | Wilcox et al. .............. 715/854 |
| 6,009,196 A | * | 12/1999 | Mahoney ..................... 382/176 |
| 6,026,182 A | * | 2/2000 | Lee et al. .................... 382/173 |
| 6,078,936 A | * | 6/2000 | Martin et al. ............... 707/527 |
| 6,195,459 B1 | * | 2/2001 | Zhu ............................ 382/176 |
| 6,341,183 B1 | * | 1/2002 | Goldberg .................... 345/762 |

FOREIGN PATENT DOCUMENTS

| | | |
|---|---|---|
| EP | 0 544 509 A2 | 6/1993 |
| WO | WO 99/35819 | 7/1999 |

OTHER PUBLICATIONS

Sundaramoorthly, G. et al., "Graphical User Interface System for Automatic 3-D Medical Image Analysis", Proceedings of the 5$^{th}$ Annual IEEE Symposium on Computer-Based Medical Systems, New York, Jun. 14-17, 1992, pp. 421-428.

* cited by examiner

Primary Examiner—Raymond J. Bayerl
(74) Attorney, Agent, or Firm—Oliff & Berridge, PLC (57) ABSTRACT

A system and method that are capable of assembling customizable graphical user interfaces to facilitate image processing in segmented images. The system receives an input segmented image. A correlation is then made between a selected portion of the input image and a predetermined set of image processing tools. The image processing tools corresponding to the selected portion are then assembled into a graphical user interface. The user then selects from this tailored list an appropriate image processing function.

21 Claims, 7 Drawing Sheets

METHOD AND SYSTEM TO ESTABLISH DEDICATED INTERFACES FOR THE MANIPULATION OF SEGMENTED IMAGES

BACKGROUND OF THE INVENTION

1. Field of Invention

This invention is related to dedicated graphical user interfaces for segmented images.

2. Description of Related Art

Numerous image processing software applications are available. These applications typically require a user to select a portion of the image to which a subsequently selected image processing function will be applied. For example, using a selection tool such as a mouse, the user selects a portion of an image for image processing. For example, a user places the selection tool, such as a mouse, in a portion of an image. While holding down the left mouse button, and traversing the image, a rectangle is drawn and the portion of the image contained in this rectangle is selected for image processing.

Once the desired portion is selected, the selected portion, or a subportion of the selected portion is reproduced in a graphical user interface. Then, again using the selection tool, the user navigates through the graphical user interface to locate, select and execute any desired image processing function. Upon executing the desired image processing function, the entire selected image portion, or selected subportion, is modified by the selected image processing function.

SUMMARY OF THE INVENTION

In highly complicated or intricate images, which contain portions having numerous different image types, it may be difficult or impossible to apply the desired image processing tool to only a particular image type, i.e., photograph, text, or the like.

Additionally, selecting a desired portion, and subsequently incorporating the selected portion into a graphical user interface, generally obscures at least a portion of the original image. Furthermore, the user is required to continually manipulate between the original image and the user interface.

Segmented images can contain segmentation classifiers that identify the image types of various portions of an image. For example, the segmentation classifier can indicate a particular portion of an image is a photograph, a half-tone region, a text region, a line art region, or any other well-known image type. Thus, the segmented image can be any image having an associated portion of data or segmentation map containing segmentation classifiers corresponding to at least one portion of the image.

This invention provides systems and methods for assembling a graphical user interface that is appropriate for image processing functions associated with a particular image type.

The methods and systems of this invention streamline selection and subsequent image processing of segmented images. In various exemplary embodiments of the systems and methods according to this invention, as a user selection tool traverses an image, the system is able to determine what image type is associated with the coordinate in the image of the user's selection tool. Knowing the image type for the selected portion, the systems and methods of this invention can then assemble a tailored graphical user interface that contains image processing functions that are appropriate for that particular image type. For example, if a segmentation classifier indicates the selection tool is positioned over a color photograph portion of an image, the systems and methods of this invention select and assemble an appropriate grouping of image processing tools that are generally appropriate for processing color photographs.

These and other features and advantages of this invention are described in, or are apparent from, the following detailed description of the exemplary embodiments.

BRIEF DESCRIPTION OF THE DRAWINGS

Various exemplary embodiments of this invention will be described in detail, with reference to the following figures, wherein.

DETAILED DESCRIPTION OF PREFERRED EMBODIMENTS

Many processes exist for segmenting images into component elements. The component elements of an image include such items as text, graphics, background, etc. Image segmentation is generally used as a first step before further processing an image. For example, segmenting the text from other elements in the image facilities optical character recognition processes. By segmenting the text from the rest of the image, optical character recognition processes are applied only to those portions of the image containing text. This saves processing time, since the optical character recognition process does not attempt to identify text characters in the graphical or the background region of the image, regions where text is generally not present. Image segmentation is also useful for other types of image processing, such as image compression or image manipulation, or such as image identification, where the image is identified as a particular type of document by determining the configuration of the elements in the image.

The methods and systems of this invention assume the input image has been previously analyzed and a segmentation map generated for the image. For example, descriptions of exemplary segmentation techniques can at least be found in U.S. Pat. Nos. 5,889,523, 5,875,265, 5,850,475, 5,850,474, 5,809,179, 5,802,203, 5,767,978, 5,765,029, 5,745,596, 5,710,887, 5,513,282, and 5,390,029, each of which is incorporated herein by reference in its entirety, can be used to generate the input segmented image. However, it should be appreciated that any known or later developed method for generating a segmented image will work equally well with the systems and methods of this invention. Therefore, the segmented input image can be any image having an associated portion of data or segmentation map containing segmentation classifiers corresponding to at least one portion of the image.

The segmented image processing systems and methods according to this invention receive a segmented input image. The segmentation map associated with the segmented input image is then identified. The segmentation map is then mapped to the segmented input image. As a user traverses the segmented input image, for example with a selection tool such as a mouse, the position of the selection tool within the segmented input image is detected.

After detecting the position of the selection tool, a segment of the segmented input image is associated with the mouse position based on the segmentation map. Optionally, at this time the associated segment can be highlighted, for example using a dotted outline, to aid the user in identifying the segment corresponding to the position of the selection tool.

If the user desires to perform image processing on the segment associated with the current selection tool position, the user selects, for example, with the click of a mouse, the segment associated with the current selection tool position. Upon selecting a segment for image processing, the systems and methods of this invention input or otherwise retrieve the segmentation classifier associated with the selected segment. Based on the segmentation classifier, the systems and methods of this invention determine the available and/or appropriate image processing tool(s) associated with the segmentation classifier for the selected segment. An image processing graphical user interface is then assembled based on the image processing tools associated with the segmentation classifier. A user's selection within the graphical user interface is then detected and a corresponding image processing tool applied to the selected segment. The user then has the option of performing further image processing to the selected segment, storing the updated image, undoing the image processing function, or selecting another segment for image processing.

Figure 1:
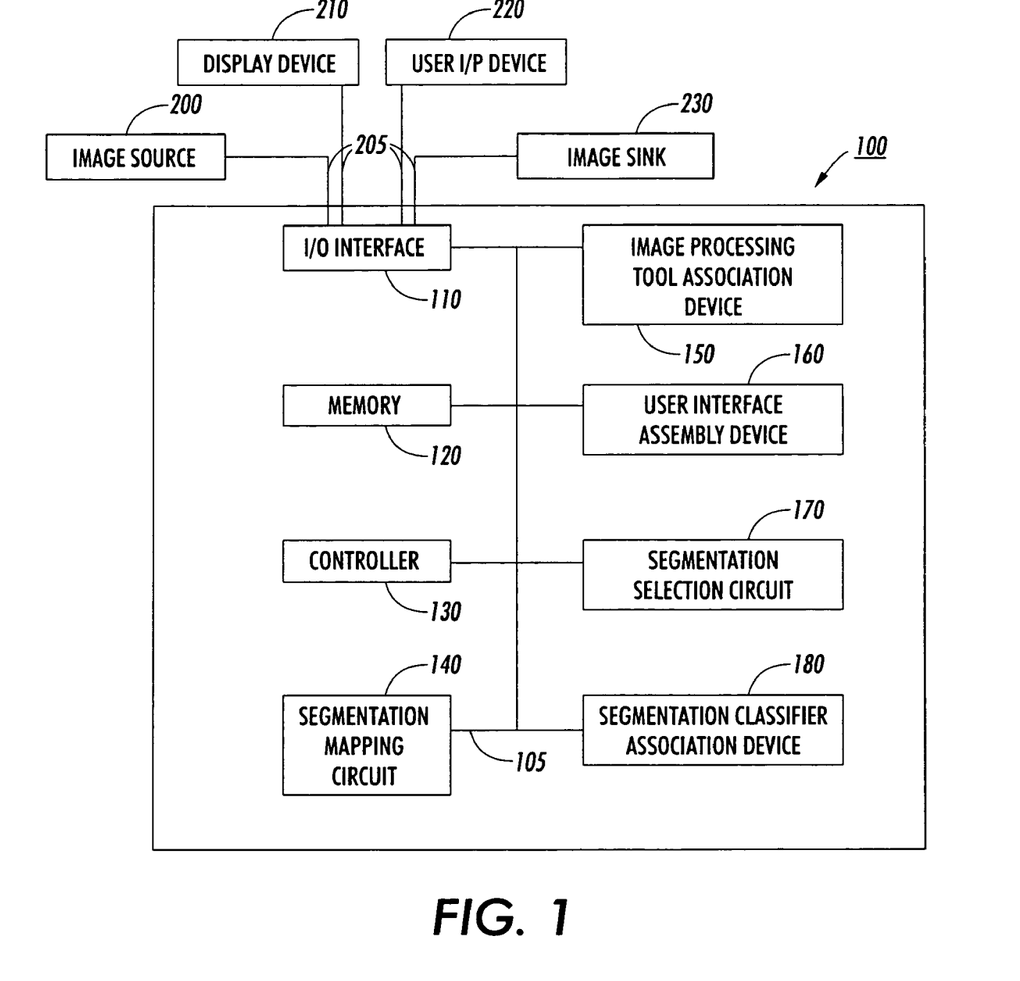
FIG. 1 is one exemplary embodiment of a functional block diagram illustrating a segmented image processing system according to this invention.

FIG. 1 is a functional block diagram of one exemplary embodiment of a segmented image processing system 100 according to this invention. The segmented image processing system 100 allows for image processing of one or more segments within a received segmented image. The segmented image processing system 100 comprises an input/output (I/O) interface 110, a memory 120, a controller 130, a segmentation mapping circuit 140, an image processing tool association device 150, a graphical user interface assembly device 160, a segmentation selection circuit 170, and a segmentation classifier association device 180 all interconnected by a control/data bus 105.

A segmented image is input from an image source 200 over a signal line 205 to the segmented image processing system 100. It should be appreciated that the image source 200 can be any device that stores and/or generates a segmented image.

Thus, the image can be a printed hardcopy version of the image and the image source 200 can be a scanner that scans and outputs a segmented electronic version of the image over the signal line 205 to the segmented image processing system 100. Furthermore, the image source 200 and segmented image processing system 100 can be elements integrated into a digital photocopier, a printer, a facsimile machine, a personal computer, or the like.

Similarly, the image source 200 can be a server or other node on a local area network, a wide area network, an intranet, the Internet, or any other distributing network.

Similarly, the image source 200 can be a storage device or any other known structural apparatus for indefinitely storing the image, such as RAM, a hard drive and disk, a floppy drive and disk, an optical drive and disk, a flash memory or the like. In this case, the image is already stored in an electronic form. Thus, the image source 200 and the signal line 205 can be any known or later developed elements that are capable of supplying an electronic segmented image to the segmented image processing system 100.

The image sink 230 can be any device that outputs, displays or stores the resulting adjusted segmented image. For example, the image sink 230 can be a printer, a video display, a digital or analog photocopy machine, a volatile or non-volatile storage media or any other image sink that is capable of displaying or storing the adjusted segmented image. Additionally, the image sink 230 can be a storage device or any other known structural apparatus for indefinitely storing the image, such as RAM, a hard drive and disk, a floppy drive and disk, an optical drive and disk, a flash memory or the like. The image sink 230 and the signal line 205 can be any known or later developed elements that are capable of receiving and storing and/or outputting an electronic image from the segmented image processing system 100.

The signal lines 205 can be any known or later developed device or system for connecting the image source 200 or the image sink 230 to the segmented image processing system 100, including a direct cable connection, a connection over a wide-area network or a local-area network, a connection over an intranet, a connection over the Internet, or a connection over any other distributed processing wired or wireless network or system. Finally, the signal lines 205 can be a wired or wireless link to a scanner or other image input/conversion device that forms and/or stores the image. In general, the signal lines 205 can be any known or later developed connection system or structure usable to connect the image source and image sink to the segmented image processing system 100.

The display device 210, in cooperation with a user input device 220, provides a user with the ability to view and selectively modify, respectively, the input segmented image. For example, the display device 210 can be a video monitor and the user input device 220 can be a mouse. Alternatively, the display device 210 can be a touch sensitive screen and a user input device 220 integrated into the display device 210. Therefore, any single device, or combination of devices, that are capable of conveying the segmented image to a user, and receiving a user input for processing the segmented image, are usable with a segmented image processing system 100.

A segmented image is received by the segmented image processing system 100 from the image source 200 via the I/O interface 110. The segmented image, at the direction of controller 130, is stored in memory 120 for subsequent processing by the segmentation mapping circuit 140. The segmentation mapping circuit 140 identifies the segmentation map associated with the segmented input image. The identified segmentation map is then mapped to the input segmented image by the segmentation mapping circuit 140. This allows alignment of the image coordinates and an associated segmentation classifier.

Once the segmentation map has been mapped to the input segmented image, the segmented image is displayed on the display device 210. After displaying the segmented image on the display device 210, the controller 130 monitors the user input device 220 for input. In particular, the controller 130, in cooperation with segmentation mapping circuit 140, detects a user's input, for example a cursor position, in the segmented image. As the cursor moves throughout the segmented image, the segmentation mapping circuit 140, in cooperation with the segmentation selection circuit 170, determines the segment of the segmented image associated with the current cursor position based on the segmentation map.

For example, as a user traverses the segmented image, for example with a mouse pointer, the segmented image processing circuit 100 could highlight the segment associated with the cursor position. For example, the segmented image processing system 100 could generate a dotted line around the segment associated with the cursor position. Alternatively, the segmented image processing system 100 could use any known or later developed technique that is capable of conveying to a user that a particular segment has been detected that corresponds to the current cursor position.

The controller 130 monitors the user input device 220 until a segment is selected for image processing. For example, if the user input device 220 is a mouse, the user could click the left mouse button to indicate that a user would like to select that segment for image processing.

A segmentation classifier identifies the type of image segment. For example, the segmentation classifier could correspond to a photograph, a half-tone region, a text region, a line art region, etc. The segmentation map identifies data that contains the image classifiers for the image, and optionally, information as to the location, or boundaries, of each segment. For example, this could be a one-to-one correspondence of pixel-to-segment or a coordinate system that correspond to the boundaries of the segment.

When a selection command is received from the user input device 220, the controller 130 activates the segmentation selection circuit 170. The segmentation selection circuit 170, based on the segmentation map, selects the selected segment for image processing. Upon selection of a segment, the segmentation classifier association device 180 determines the segmentation classifier associated with the selected segment. As previously described, the segmentation classifier could be, for example, a photograph, a half-tone region, text region, a line art region, etc.

Once the segmentation classifier associated with the selected segment is identified, the image processing tool association device 150 determines the appropriate image processing tool or tools that correspond to the segmentation classifier.

The image processing tools or functions associated with the segmentation classifiers can be predefined, continuously updatable and/or user configurable. Table 1 illustrates typical image processing functions that may be associated with certain segmentation classifiers. For example, if the segmentation classifier for the selected segment indicates that the selected segment is a color image/photograph, typical image processing functions performed on that type of segmentation classifier could be brightness, contrast, rotation, scaling, etc.

Alternatively, for example, if the image classifier indicates that the segment is a line art region, some of the selectable image processing tools could be error diffusion, color adjustment or threshold.

TABLE 1

| | SEGMENTATION CLASSIFIER | | | |
|---|---|---|---|---|
| | Color Image/ Photograph | Halftone | Text | Line Art |
| IMAGE PROCESSING FUNCTION | Brightness Contrast Rotation Scaling Crop Fill Background Suppression Tone Adjustment Error Diffusion Color Adjustment Halftone Screen Adjustment Sharpen Blur Polarize | Brightness Contrast Rotation Scaling Crop Fill Background Suppression Tone Adjustment Error Diffusion Color Adjustment Halftone Screen Adjustment Moiré Reduction Descreening | Brightness Contrast Rotation Scaling Crop Fill Background Suppression Tone Adjustment Error Diffusion Color Adjustment Bevel Shadow Smooth | Brightness Contrast Rotation Scaling Crop Fill Background Suppression Tone Adjustment Error Diffusion Color Adjustment Threshold Invert Colors |

While Table 1 is not intended to be either exhaustive or restrictive in terms of the image processing functions that could be applied to particular segmentation classifiers, it does provide exemplary image processing functions associated with some of the most commonly occurring segmentation classifiers. If a particular user determines that a particular image processing function would be useful for processing a particular segmentation classifier, the user could update the associations stored in the image processing tool association device 150 so that that particular image processing function would also be available to the user during image processing.

For example, the image processing tool association device 150 could include a database (not shown). This database could store a plurality of sets of segmentation classifiers and associated image processing tools. To add/delete image processing tools associated with a particular segmentation classifier in a given set, a user would only need edit the data base entries.

For example, Table 2 illustrates an exemplary user-created correlation of segmentation classifiers to image processing functions.

TABLE 2

| | SEGMENTATION CLASSIFIER | | |
|---|---|---|---|
| | Color Image | Photograph | Text |
| IMAGE PROCESSING FUNCTION | Brighten Darken | Negative UV Filter Sepia | Chromize Water Droplets Bevel Perspective Watermark |

In this example, the user frequently performs only limited image processing functions on each of the color image and photograph segments of an input image. However, in this example, the user may perform substantial work with text, so additional customized tools are defined. Thus, there is no need to have extraneous, infrequently used tools listed in the user interface.

Therefore, it should be appreciated that any combination of classifiers and image processing tools can be associated and tailored to a user's needs.

The user interface assembly device 160 retrieves the image processing tool identifications determined by the image processing tool association device 150 to be associated with the selected segmentation classifier. Having identified the image processing tools, the user interface assembly device 160 then assembles at least one selectable interface widget into a user interface based on the image processing tools associated with the segmentation classifier. This user interface is then displayed on the display device 210. When the controller 130 detects a selection of an image processing tool from the displayed user interface, the controller 130, in cooperation with memory 120, performs the selected image processing on the selected segment. The updated image, or segment, is then displayed on display device 210.

This process of selecting segments, and subsequently processing the selected segments, continues until a user has completed the desired modifications of the input segmented image.

Figure 2:
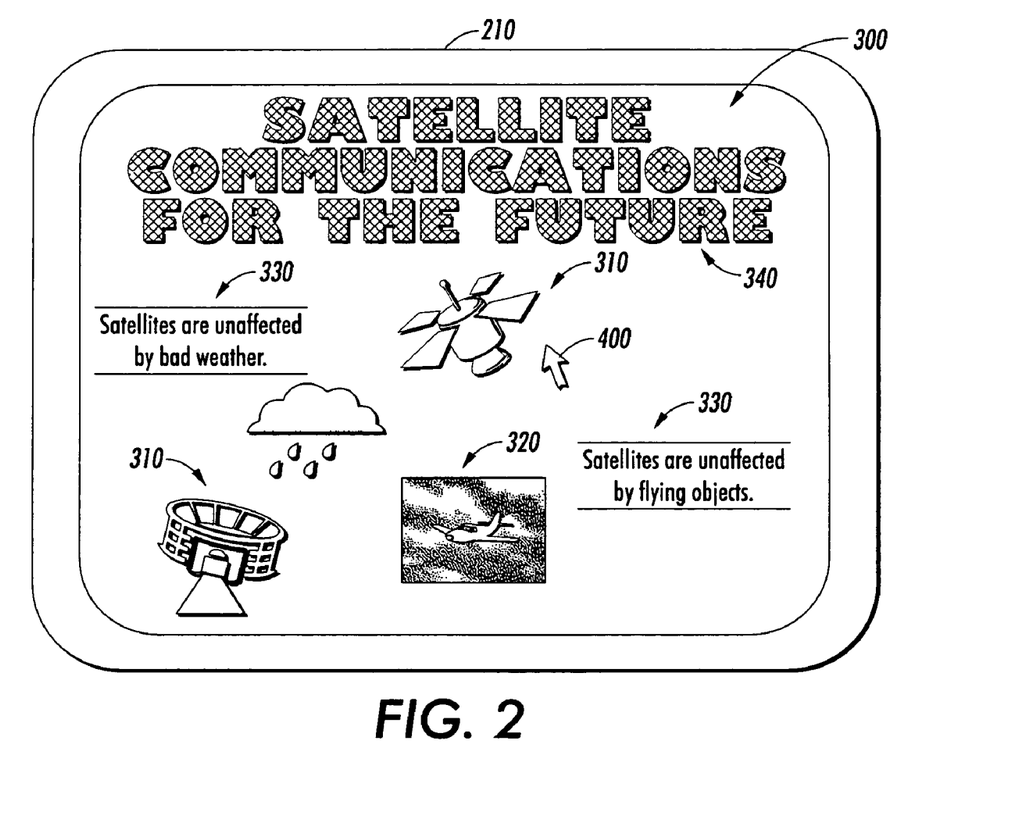
FIG. 2 shows an exemplary segmented image.

FIG. 2 illustrates an exemplary segmented image 300 that can be displayed on the display device 210. This exemplary segmented image 300 comprises a plurality of segments. Specifically, the segmented image 300 comprises a line art segment 310, a color photograph segment 320, a text segment 330, and a color text segment 340. As previously described, as a user selection device, such as a cursor 400, traverses the segmented image 300 shown on the display device 210, the segment associated with the cursor position could be highlighted.

Figure 3:
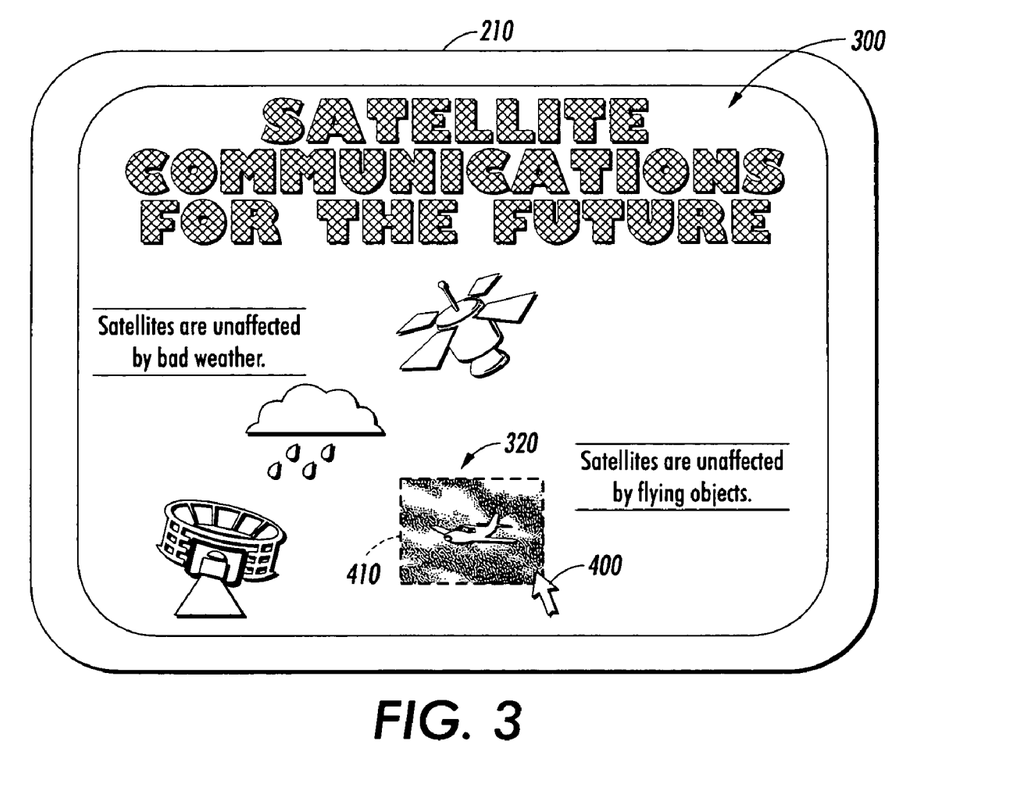
FIG. 3 illustrates selection of a particular segment of the segmented image shown in FIG. 2.

FIG. 3 illustrates an exemplary highlighting technique that can be used to indicate the extent of the segment associated with the cursor 400. As shown in FIG. 3, in this exemplary highlighting technique, the segment 320 is highlighted by outlining the segment 320 with dotted lines 410. However, it should be fully appreciated that any method of highlighting the segment associated with the current position of the cursor 400 can be used. For example, highlighting techniques such as offsetting, outlining, hovering, zooming, or the like could be used. In general, any known or later developed method of conveying the boundaries of a segment associated with the current cursor position to a user can be used equally successfully with the systems and methods of this invention.

Figure 4:
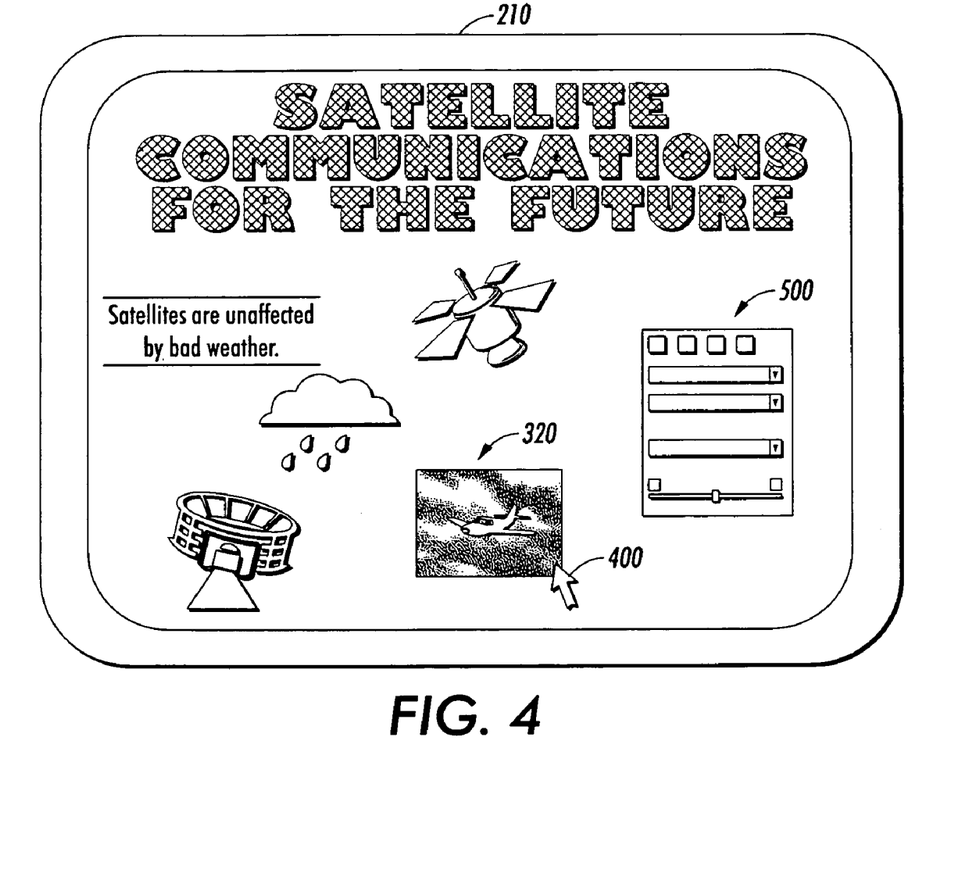
FIG. 4 illustrates one exemplary embodiment of a graphical user interface according to this invention associated with a selected image segment.

FIG. 4 illustrates an exemplary image that displayed on the display device 210 upon selection by a user of a particular image segment. As shown in FIG. 4, the color photograph segment 320 has been selected by the user. Upon selection of the segment 320 by the user, the segmented image processing system 100 assembles a user interface based on the image processing functions corresponding to the selected segment 320. Also as shown in FIG. 4, the user interface 500 can be displayed adjacent to the selected image segment. However, it should be appreciated that the user interface 500 can appear anywhere within the display device 210. Furthermore, the user interface 500 need not be freestanding, as shown, but could be incorporated into pull-down menus, pop-up menus, or the like.

Figure 5:
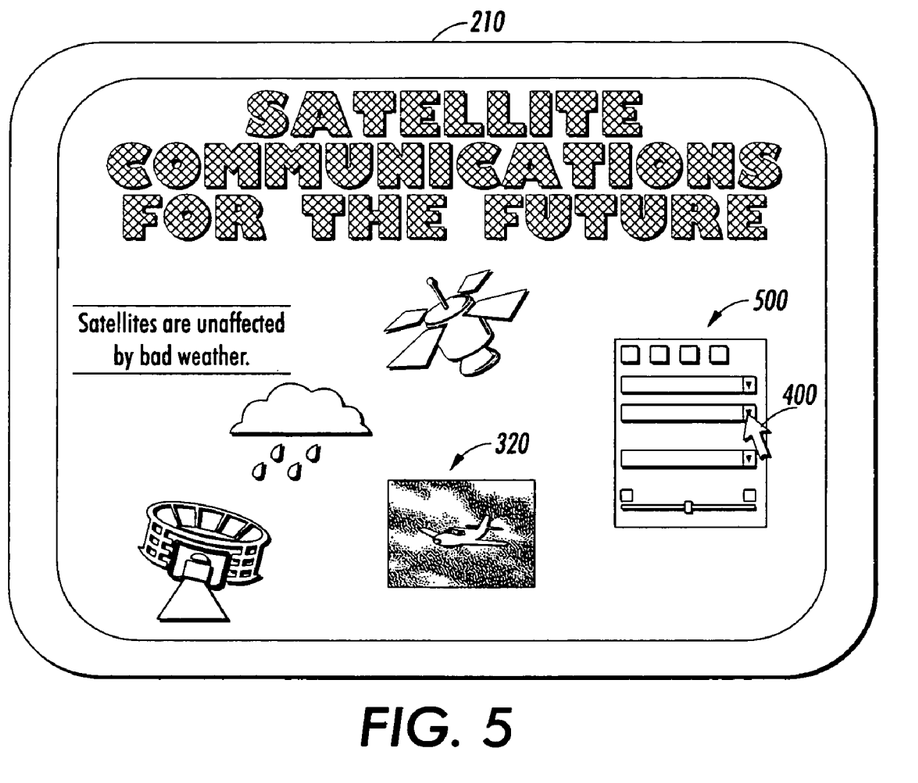
FIG. 5 shows selection of an image processing function within the exemplary graphical user interface of FIG. 4.

FIG. 5 illustrates that once a segment, such as the segment 320, has been selected, the user is then able to manipulate the cursor 400 to select an image processing function from the user interface 500. Alternatively, if the user decides, for example, that the wrong segment was selected, the user can move the cursor 400 to the correct segment, and select that other segment.

Figure 6:
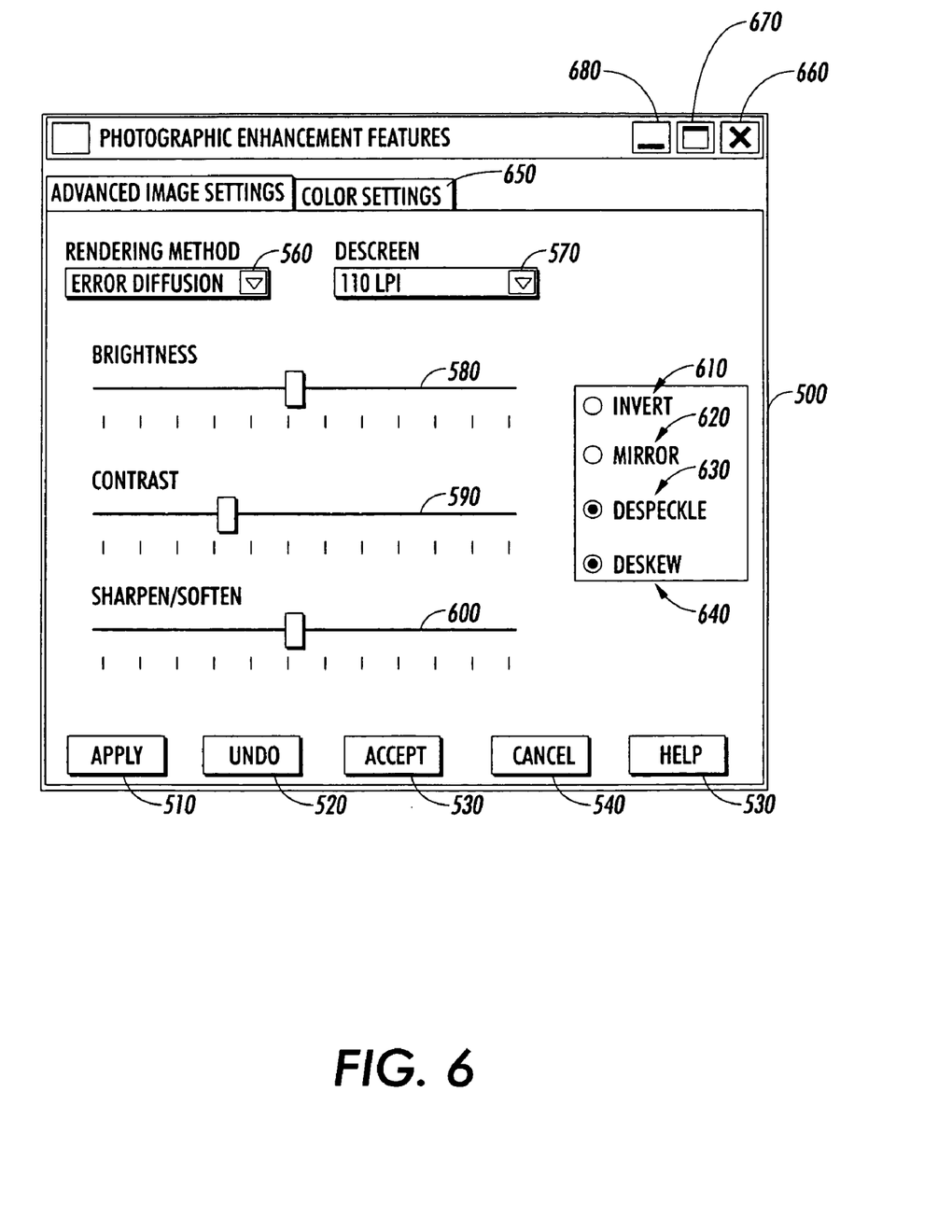
FIG. 6 shows an exemplary graphical user interface similar to those shown in FIGS. 4 and 5 in greater detail.

FIG. 6 illustrates an exemplary view of a user interface 500 similar to that shown in FIG. 5. This exemplary user interface 500 corresponds to an exemplary user interface assembled based on, for example, a color photograph segment. However, it should be appreciated that this exemplary user interface is not intended to be either exhaustive or restrictive in terms of the image processing functions, or arrangement thereof, that could be generated by the systems and methods of this invention, The exemplary user interface 500 comprises: an apply button 510, an undo button 520, an accept button 530, a cancel button 540, a help button 550, a pull-down menu 560, a pull-down menu 570, sliding bars 580, 590 and 600, radio buttons 610–640, a tab 650, a close button 660, a restore button 670 and a minimize button 680.

The exemplary user interface 500 comprises particular image processing tools that are associated with the selected image segment. In particular, the exemplary user interface 500 illustrates exemplary tools that may be used with a photograph. Specifically, the pull-down menu 560 allows a user to select the type of rendering method for the image. The pull-down menu 570 shows the lines-per-inch options for descreening. The slider bars 580–560 allow basic image processing functions to be applied to the selected image segment. In particular, brightness bar 580 adjusts the brightness of the selected segment, the contrast bar 590 adjusts the contrast of the selected segment, and the sharpen/soften bar 600 modifies the sharpness of the selected segment.

The radio buttons 610–640 illustrate exemplary image processing tools which have an "on" or "off" characteristic. In particular, the radio button 610 inverts the selected segment, the radio button 620 mirrors the selected segment, the radio button 630 despeckles the selected segment and the radio button 640 deskews the selected segment. To invoke any one of these radio buttons, and in turn a corresponding image processing function, the user selects that radio button.

The buttons 510–550 are typical user interface buttons found on a graphical user interfaces. For example, after a user has selected the particular image processing tools, and corresponding specifications, the user can select the apply button 510. This would apply the selected image processing tools to the selected segment. Alternatively, if the user, for example, determines that a different type of image processing is desired, the user can select the undo button 520. The undo button 520 would reverse the image processing tools invoked by the last selection of the apply button 510. However, it should be appreciated, that the undo button 520 can have an associated memory so that multiple "undos" are possible.

The accept button 530, which could also be designated as a "save" button finalizes, or saves, the modified selected segment. The cancel button 540 allows a user to exit out of the graphical user interface 500 without performing any image processing functions. For example, the graphical user interface 500 may have an associated memory that allows previous settings to be reproduced during a later rendering of the graphical user interface. If the user accidentally disturbs these settings, the user may retrieve the previously used settings by simply clicking the cancel button 540. Then, upon reselecting of a particular segment, the previously used settings for the image processing tools would be redisplayed.

The help button 530, as appreciated by those skilled in the art, could include help topics regarding the particular image processing functions that are shown in the graphical user interface 500, as well as, but not limited to, information regarding the selected image segment, previously applied image processing tools, information regarding other segments in the image, or the like.

Additionally, the graphical user interface 500 may have tab buttons such as the color setting tab button 650. For example, in the exemplary photograph enhancement feature of graphical user interface 500, there may be too many image processing functions to place in one frame of the graphical user interface. Therefore, the graphical user interface can have many "layers" allowing users to tab through the multitude of image processing functions.

The close button 660, restore button 670 and minimize button 680, upon selection, allows the user to close, resize and minimize, respectively, the graphical user interface.

Figure 7:
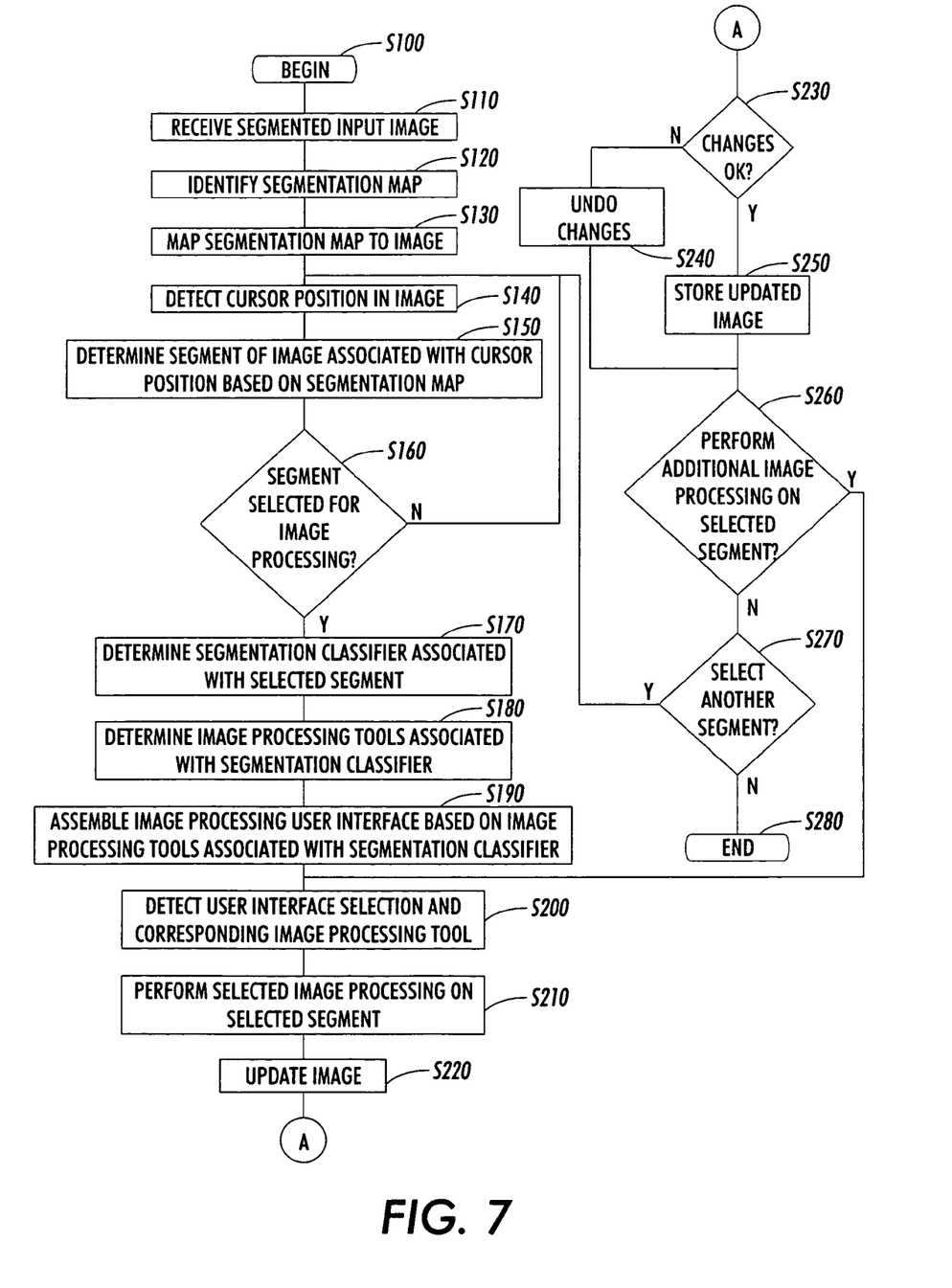
FIG. 7 is a flowchart outlining one exemplary embodiment of a method for generating a dedicated graphical user interface based on a selected image segment according to this invention.

FIG. 7 illustrates one exemplary embodiment of a method for establishing dedicated interfaces for the manipulation of segmented images in accordance with this invention. Control begins in step S100 and continues to step S110, where the segmented input image is received. Next, in step S120, the segmentation map associated with a segmented input image is identified. Then, in step S130, the segmentation map is mapped to the input segmented input image. Control then continues to step S140.

In step S140, the current position of the user's selection tool, or cursor, in the image is detected. Next, in step S150, the segment of the input segmented image associated with the current cursor position is determined based on the segmentation map. Then, in step S160, a determination is made whether the segment associated with the cursor position is selected for image processing. If the segment is not selected, control jumps back to step S140. Otherwise, control continues to step S170.

In step S170, the segmentation classifier associated with the selected segment is determined. Next, in step S180, the image processing tools associated with the determined segmentation classifier are determined. Then, in step S190, an image processing user interface is assembled based on the determined image processing tools. Control then continues to step S200.

In step S200, a selection from the user interface is detected. Next, in step S210, the selected operation or image processing is performed on the selected segment. Then, in step S220, the displayed image is updated. Control then continues to step S230.

In step S230, a determination is made whether the changes are acceptable. If the changes are acceptable, control continues to step S250. If the changes are not acceptable, control continues to step S240. In step S240, at least the last previously invoked image processing function is undone. Control then jumps directly to step S260.

In contrast, in step S250, the update image is stored. Next, in step S260, a determination is made whether additional image processing is to be performed on the selected segment. If additional image processing is desired, control jumps back to step S200. Otherwise, control continues to step S270.

In step S270, a determination is made whether another segment has been selected. If another segment has been selected, control continues back to step S140. Otherwise, control continues to step S280 where the control sequence ends.

While the above-described method illustrates an exemplary operational path the user may take to implement the methods of this invention, it is evident that many alternatives, modifications and variations will be apparent to those skilled in the art.

For example, between step S150 and step S160, a "highlight" step could be inserted. This highlight step, as previously described, could, for example, outline with a dotted line, the segment associated with the current cursor position. Additionally, it should be fully appreciated that at any time during the above-described method, a user could click a "close" button to close the graphical user interface.

As shown in FIG. 1, the segmented image processing system 100 is preferably implemented on a programmed general-purpose computer. However, the segmented image processing system 100 can also be implemented on a special purpose computer, a programmed microprocessor or microcontroller and peripheral integrated circuit elements, an ASIC or other integrated circuit, a digital signal processor, a hardwired electronic logic circuit such as a discrete element circuit, a programmable logic device such as a PDL, PLA, FPGA or PAL, or the like. In general, any device, capable of implementing a finite state machine that is in turn capable of implementing the flowcharts shown in FIG. 7 can be used to implement the segmented image processing system 100 in accordance with this invention.

Furthermore, the disclosed method may be readily implemented in software using object oriented software development environments that provide portable source code that can be used on a variety of computer or workstation hardware platforms. Alternatively, the disclosed segmented image processing system may be implemented partially or fully in hardware using standard logic circuits or a VLSI design. Whether software or hardware is used to implement this system is dependent on the speed or efficiency requirements of this system, the particular function, and the particular software or hardware systems or microprocessor or microcomputer systems being utilized. The segmented image processing system and method described above, however, can be readily implemented in hardware or software using any known or later developed systems or structures, devices and/or software by those skilled in the applicable arts without undue experimentation from the functional description provided herein together with a general knowledge of the computer arts.

Moreover, the disclosed methods may be readily implemented as software executed on a programmed general purpose computer, a special purpose computer, a microprocessor or the like. In this case, the method and system of this invention can be implemented as a routine imbedded in a photocopier, as a resource residing on a server or graphics workstations, or the like. The segmented image processing system 100 can also be implemented by physically incorporating the system and method into a software and/or hardware system, such as the hardware and software systems of a graphics workstation or a digital photocopier.

It is, therefore, apparent that there has been provided, in accordance with the present invention, a system and method for segmented image processing. While this invention has been described in conjunction with preferred embodiments thereof, it is evident that many alternatives, modifications and variations will be apparent to those skilled in the art. Accordingly, Applicants intend to embrace all such alternatives, modifications and variations that follow in the spirit and scope of this invention.

What is claimed is:

1. A system that assembles a dedicated user interface that allows an input segmented image to be manipulated comprising:

a segmentation classification association circuit that associates a segmentation classifier and at least one segment of the input segmented image; and an image processing tool association circuit that determines at least one image processing tool corresponding to the segmentation classifier, the at least one image processing tool allowing a user to manipulate the input segmented image via the dedicated user interface.

2. The system of claim 1, further comprising a user interface assembly circuit that assemblies at least one selectable interface widget into at least one user interface based on the at least one image processing tool corresponding to the segmentation classifier.

3. The system of claim 2, wherein the system modifies the at least one segment based on a selection of the at least one image processing tool associated with the at least one user interface.

4. The system of claim 1, further comprising a segmentation mapping circuit that determines the at least one segment based on a position of a user input device in the input segmented image.

5. The system of claim 4, wherein the segment mapping circuit highlights the at least one segment based on the position of a user input device in the input segmented image.

6. The system of claim 1, further comprising a segmentation selection circuit that selects the at least one segment.

7. The system of claim 1, wherein the image processing tool association circuit determines the at least one image processing tool based on at least one of predefined configurable association data, updatable configurable association data or user configurable association data.

8. The system of claim 1, wherein the segmentation classifier corresponds to at least one of a photographic region, a half-tone region, a text region, a line art region, a black and white region or a color region.

9. The system of claim 1, wherein the dedicated user interface is a graphical user interface comprising at least one of a drop-down menu, a pull-down menu, a radio button, a tab button, a segment display area or a slide bar.

10. A storage medium that stores information, the information controlling assembly of a dedicated user interface that allows manipulation of an input segmented image and comprising:

information that associates a segmentation classifier and at least one segment of the input segmented image; and information that determines at least one image processing tool corresponding to the segmentation classifier, wherein the at least one image processing tool allows a user to manipulate the input segmented image via the dedicated user interface.

11. The storage medium of claim 10, further comprising information that assembles at least one user interface based on the at least one image processing tool corresponding to the segmentation classifier.

12. A method of assembling a dedicated user interface for manipulation of an input segmented image comprising:

determining a segmentation classifier associated with at least one segment of the input segmented image; and associating at least one image processing tool with the at least one segment of the input segmented image, wherein the at least one image processing tool allows a user to manipulate the input segmented image via the dedicated user interface.

13. The method of claim 12, further comprising assembling at least one selectable interface widget into at least one user interface based on the at least one image processing tool associated with the segmentation classifier.

14. The method of claim 13, further comprising modifying the at least one segment based on a selected image processing tool.

15. The method of claim 12, further comprising determining at least one segment based on a position of a user input device.

16. The method of claim 12, further comprising selecting at least one segment.

17. The method of claim 12, further comprising determining at least one image processing tool based on at least one of predefined configurable association data, updatable configurable association data or user configurable association data.

18. The method of claim 17, further comprising updating the user configurable association data.

19. The method of claim 12, wherein the segmentation classifier corresponds to at least one of a photographic region, a half-tone region, a text region, a line art region, a black and white region or a color region.

20. The method of claim 12, further comprising highlighting the at least one segment of the input segmented image.

21. The method of claim 12, wherein the dedicated user interface is a graphical user interface comprising at least one of a drop-down menu, a pull-down menu, a radio button, a tab button, a segment display area or a slide bar.

* * * * *